May 17, 1949.  H. R. ABBRECHT  2,470,386
LUBRICATING DEVICE
Filed July 31, 1945  2 Sheets-Sheet 1
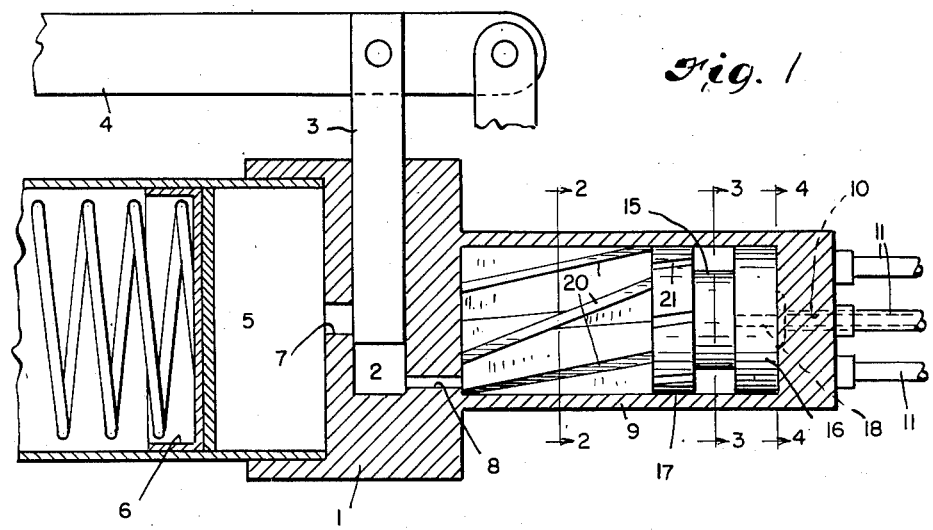
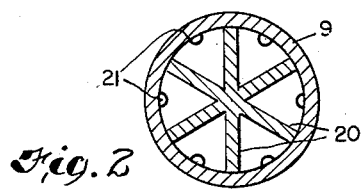
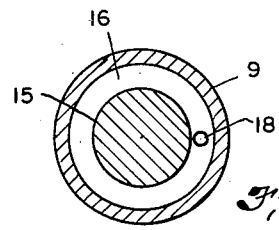
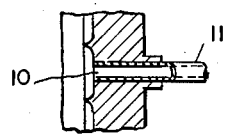
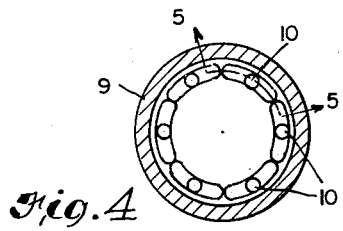
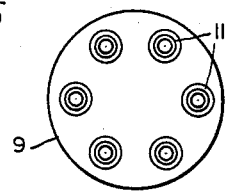
INVENTOR.
HERMANN R. ABBRECHT
BY
Oberlin & Limbach
ATTORNEYS May 17, 1949.  H. R. ABBRECHT  2,470,386
LUBRICATING DEVICE
Filed July 31, 1945  2 Sheets-Sheet 2
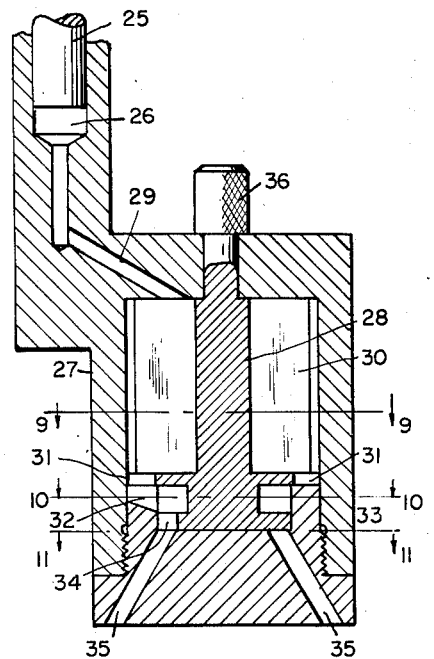
Fig. 7
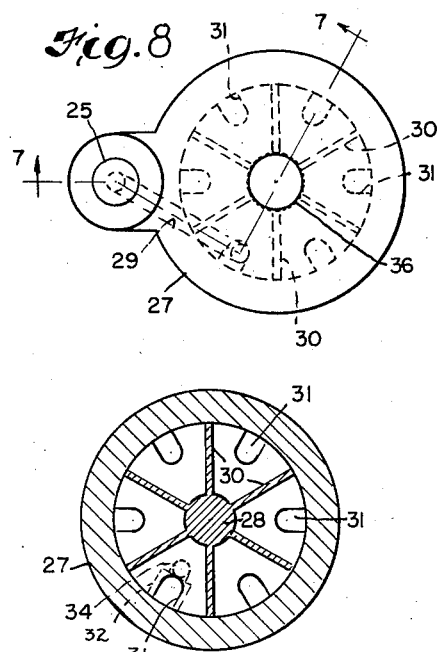
Fig. 8
Fig. 9
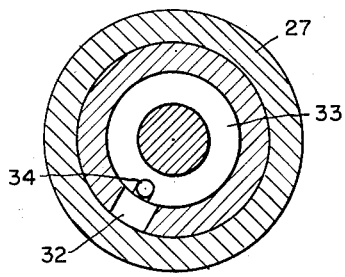
Fig. 10
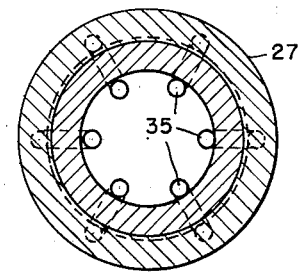
Fig. 11
INVENTOR.
HERMANN R. ABBRECHT
BY
Oberlin + Limbach
ATTORNEYS Patented May 17, 1949

2,470,386

UNITED STATES PATENT OFFICE 2,470,386

LUBRICATING DEVICE

Hermann R. Abbrecht, Shaker Heights, Ohio

Application July 31, 1945, Serial No. 607,987

6 Claims. (Cl. 184—35)

The present improvements, while relating as indicated to lubricating devices, may have more general application to the controlled feeding of mobile liquid other than lubricants, i. e. to the delivery thereof in successive measured amounts.

One principal object of the invention is to provide a device of the type in question in which the lubricant or equivalent mobile fluid upon being supplied under suitable pressure will itself actuate the device to deliver measured quantities of the fluid. Where used as a lubricating device the measured quantities may be delivered to a plurality of discharge lines leading to a corresponding number of bearings or the like. On the other hand, where used simply for metering purposes delivery may be made by way of a single discharge line to a mixing apparatus, or elsewhere as desired.

A further object of the invention is to provide a device of the type in question which will comprise a minimum number of parts, will be of exceedingly simple construction, and not likely to get out of order. Still another object is to provide a device which in case the discharge is to a plurality of lubricating points, will indicate when any such point, e. g. a frozen bearing, is obstructed, so that the free flow of lubricant thereto is hindered.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is an axial sectional view of one form of my improved device designed to be used for the progressive lubrication of a plurality of bearings, certain interior parts being shown in elevation and certain associated parts appearing in broken outline only;

Figs. 2, 3 and 4 are transverse sectional views of the device, the planes of the sections being indicated by the lines 2—2, 3—3 and 4—4 respectively on Fig. 1;

Fig. 5 is a broken sectional view of a detail taken on the arc indicated by the line 5—5 Fig. 4;

Fig. 6 is an end elevation of the device as viewed from the right in Fig. 1;

Fig. 7 is partially an axial sectional view similar to that of Fig. 1, and partially a longitudinal section on an angularly related plane of another form of my device;

Fig. 8 is an end elevation thereof as viewed from the upper end in Fig. 7, the several planes on which the sectional view of Fig. 7 are taken being indicated by the line 7—7; and Figs. 9, 10 and 11 are transverse sections of such device, the planes of the sections being indicated by the lines 9—9, 10—10 and 11—11 respectively on Fig. 7.

Referring to the construction of the device illustrated in Fig. 1, it will be understood that the showing is in part diagrammatic in that illustration is omitted of the manner in which the component parts are assembled together, having nothing to do with the operation of the device. As thus shown, the device consists of a lubrication gun 1 of conventional design, the head being provided with a chamber 2 in which a piston plunger 3 is reciprocable either manually through a suitable lever 4 or by power as desired. A body of the lubricant or like mobile liquid to be dispensed is contained in a chamber 5 under pressure supplied by a spring actuated piston 6 so that when plunger 3 is retracted a portion of such body will pass by way of port 7 into chamber 2; then upon depressing the plunger will be forced out through a port 8 into an adjoining cylindrical chamber 9.

The latter is closed at its outer end save for a series of circularly arranged discharge openings 10, shown as six in number, with which a corresponding series of ducts 11 that lead to the bearings or other desired points of discharge are connected. Mounted for free rotation within cylinder 9 is a vaned rotor 15 including two spaced cylindrical portions 16 and 17 that closely fit within said cylinder, the intermediate portion being of substantially less diameter so as to provide an annular space. Portion 16, which constitutes in effect a head of the rotor, abuts the end wall of said chamber and is provided with a transverse opening or port 18 located so as to be adapted to register with successive openings 10 in the end wall as the rotor turns about its axis. Extending from portion 17 of the rotor to the opposite end of chamber 9 are helically formed vanes 20, the outer edges of which fit closely with the interior wall of the chamber and divide the space in question into corresponding helically disposed compartments of segmental cross-section, as illustrated in Fig. 2. The number of such compartments will correspond with the number of discharge openings 10 in the head of the chamber, and portions 17 of the rotor are provided with a series of transverse slots 21 whereby the compartments formed by the vanes are respectively connected with the annular space between such portion and head portion 16 of the rotor.

In operating the device just described, the lubricant supplied through port 8 to chamber 9 can at one time enter only one of the spaces between adjoining vanes 20 of the rotor 15. This space at the other end will be connected by the corresponding slot 21, the annular space in the rotor and the port 18 in the distributor head thereof with which ever discharge opening 10 in the head of the chamber it happens to be aligned with. Where there is no resistance in the corresponding line 11 to the point of lubrication to which it leads, the lubricant thus supplied under pressure from the gun will flow between the vanes in question and in so doing will gradually move the rotor into a new position where the next space between the vanes thereon is brought into position to receive such lubricant; such rotation at the same time aligning port 18 with the next discharge opening 10 and thus with a second lubricating line 11. Meanwhile a measured amount of lubricant, determined by the size of rotor, will have been supplied to the first point of lubrication.

It will be understood that when the device is in operation all the spaces and passages in the rotor, as well as in the lines leading therefrom, will be filled at all times so that the effect of forcing additional lubricant from the gun into the chamber 9 will be to rotate the rotor. It will also be understood that while the helical vanes 20 of the rotor are shown as equi-distantly spaced, such spacing may be varied with corresponding change in the amount of lubricant that will be discharged therethrough before the rotor is turned to bring the next space into operative relation with the inlet and outlet openings of the chamber.

In case a line to a lubricating point is obstructed, as by a frozen bearing, so that the free flow of lubricant thereto is hindered, then there can be no movement of the rotor and it will be impossible to lubricate such point. Where the obstruction can be overcome by building up enough pressure, this result may be achieved by continued actuation of the gun and thereupon the rotor be caused to resume its movement. Otherwise the rotor will require to be turned manually by means such as shown and described in connection with the second form of the device.

The modified form of the device, illustrated in Figs. 7 to 11 inclusive, differs only in details of construction from the one just described, the principal such difference being that straight instead of helical vanes are employed on the rotor.

Referring to the figures in question, the only parts of the gun shown are the reciprocable plunger 25 and the chamber 26 wherein it operates. The latter, instead of being connected by a straight passage with the chamber 27 wherein rotor 28 is mounted, is connected therewith through a passage 29 that is rather sharply inclined to the axis of such rotor. While the vanes 30 of the latter, as just stated extend longitudinally of such axis, the effect of the flow of lubricant striking thereagainst will be to turn the rotor just as before so as to bring successive notches 31 in the outer end of the rotor into alignment with a passage 32 in the end of the latter and thus in communication with an annular space 33 in the rotor head. The latter, as before, has a port 34 which as the head turns will be brought into alignment with successive discharge openings 35.

The opposite end of the rotor, it will be noted, is provided with an axial extension 36 that projects without the corresponding end of the chamber 27, and is knurled or otherwise formed to facilitate manual rotation of the rotor in case this should become necessary.

The operation of the foregoing modified construction of the device should be obvious. Lubricant being forced into the space between any two of the vanes 30 of the rotor will cause such rotor to turn, cut off the supply to such space and bring the next space into position to receive a further suppy of lubricant. Similarly, the rotation of the distributor head of the rotor serves to connect such spaces in succession through port 34 with the several discharge passages 35 which lead to the points which it is desired to lubricate.

Since the lubricant or equivalent liquid thus successively discharged will be in accurately measured amounts, either form of the device just described may be employed simply for metering purposes, in which case instead of having a plurality of discharge outlets a single outlet at all times in communication with the annular space in the head of the rotor may be provided in the corresponding end of the chamber, or the same result may be achieved by simply bringing all of such passages together into a common outlet. By employing devices of different capacity and connecting such devices together for synchronous operation, different liquids may be thus supplied to a common mixing apparatus or the like in any desired proportion.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the character described, the combination of a cylindrical chamber, a vaned rotor fitted within said chamber, a head closing one end of said rotor save for restricted outlet openings for the spaces between the vanes of said rotor, a second head on said rotor, spaced from such first head and having a single discharge opening, the adjacent end of said cylinder having a plurality of outlet openings adapted successively to register with the opening in said second head as said rotor turns, and means adapted to supply a mobile liquid under pressure to said chamber at the opposite end thereof, whereby said rotor is caused to turn on its axis.

2. In a device of the character described, the combination of a cylindrical chamber, a vaned rotor fitted within said chamber, a head closing one end of said rotor save for restricted outlet openings for the spaces between the vanes of said rotor, a further extension of said rotor spaced from said head and having a single discharge opening, the corresponding wall of said cylinder having a plurality of outlet openings adapted successively to register with such opening in said extension as said rotor turns, and means adapted to supply a mobile liquid under pressure to said chamber at the opposite end thereof, whereby said rotor is caused to turn on its axis.

3. In a device of the character described, the combination of a chamber, a vaned rotor closely fitted within said chamber, an extension of said rotor within said chamber beyond such vaned portion, said extension fitting a wall of said chamber and having a single discharge opening therein, such wall having a plurality of outlet openings therein adapted successively to register with such opening in said extension as said rotor turns, and means adapted to supply a mobile liquid under pressure to said chamber at the opposite end thereof from said extension, whereby said rotor is caused to turn on its axis.

4. In a device of the character described, the combination of a chamber, a vaned rotor circumferentially closed fitted within said chamber, an extension of said rotor within said chamber beyond said vaned portion and closely fitting a wall of said chamber having a plurality of outlet openings therein, said extension having a lesser number of discharge openings therein adapted to register with such outlets in the chamber wall as said rotor turns, and means adapted to supply a mobile liquid under pressure to said chamber at the opposite end of said rotor.

5. In a device of the character described, the combination of a cylindrical chamber, a rotor provided with a series of longitudinally extending vanes closely fitted within said chamber, a head closing one end of said rotor save for restricted outlet openings for the spaces between the respective vanes of said rotor, and means adapted to supply a mobile liquid under pressure to only a single such space at one time, whereby said rotor is caused to turn on its axis.

6. In a device of the character described, the combination of a chamber, a vaned rotor fitted within said chamber, valve means turning with said rotor adapted to connect one end of said chamber to different outlets in sequence, and means adapted to supply a mobile liquid under pressure to the other end of said chamber to turn said rotor and discharge from such outlets in sequence.

HERMANN R. ABBRECHT.

REFERENCES CITED

The following references are of record in the file of this patent:

UNITED STATES PATENTS

| Number | Name | Date |
| --- | --- | --- |
| 584,033 | Capitaine | June 8, 1897 |
| 1,600,430 | Schmidt | Sept. 21, 1926 |
| 1,825,668 | Kennedy | Oct. 6, 1931 |
| 1,886,067 | Moses | Nov. 1, 1932 |
| 1,982,021 | Renfrew | Nov. 27, 1934 |